United States Patent
Paulraj et al.

(10) Patent No.: US 11,977,504 B2
(45) Date of Patent: May 7, 2024

(54) SMART NETWORK INTERFACE CONTROLLER OPERATING SYSTEM DEPLOYMENT

(71) Applicant: Dell Products L.P., Round Rock, TX (US)

(72) Inventors: Deepaganesh Paulraj, Bangalore (IN); Sandesh Hadhimane Balakrishna, Bangalore (IN); Jon Vernon Franklin, Pflugerville, TX (US); Sanjay Rao, Round Rock, TX (US); Chandran Venkatachalam, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/729,217

(22) Filed: Apr. 26, 2022

(65) Prior Publication Data

US 2023/0342318 A1 Oct. 26, 2023

(51) Int. Cl.
- *G06F 13/38* (2006.01)
- *G06F 13/10* (2006.01)
- *G06F 13/24* (2006.01)

(52) U.S. Cl.
CPC .......... *G06F 13/385* (2013.01); *G06F 13/105* (2013.01); *G06F 13/24* (2013.01); *G06F 2213/3808* (2013.01)

(58) Field of Classification Search
CPC .............................................. G06F 2213/3808
See application file for complete search history.

(56) References Cited

U.S. PATENT DOCUMENTS

| | | | |
|---|---|---|---|
| 8,805,951 B1* | 8/2014 | Faibish | G06F 21/6218 718/1 |
| 9,940,155 B1* | 4/2018 | Lee | G06F 9/45558 |
| 10,531,592 B1* | 1/2020 | Jau | G06F 3/0629 |
| 2005/0229173 A1* | 10/2005 | Mihm | G06F 8/65 717/171 |
| 2017/0132172 A1* | 5/2017 | Romem | G06F 16/30 |
| 2017/0177216 A1* | 6/2017 | Freyensee | G06F 3/0688 |
| 2020/0136996 A1* | 4/2020 | Li | H04L 47/125 |
| 2020/0142683 A1* | 5/2020 | Rao | G06F 9/4411 |
| 2021/0019270 A1* | 1/2021 | Li | G06F 13/4204 |
| 2021/0373786 A1* | 12/2021 | Glimcher | G06F 3/0629 |
| 2022/0210097 A1* | 6/2022 | Yang | H04L 67/1097 |
| 2022/0334989 A1* | 10/2022 | Bar-Ilan | G06F 13/4282 |
| 2022/0391341 A1* | 12/2022 | Rosenbaum | G06F 13/4221 |

* cited by examiner

*Primary Examiner* — Henry Tsai
*Assistant Examiner* — Aurangzeb Hassan
(74) *Attorney, Agent, or Firm* — Jackson Walker L.L.P.

(57) ABSTRACT

An information handling system may include a host system, a management controller configured to provide out-of-band management of the information handling system, and a network interface including a network interface storage resource. The management controller may be configured to: receive, from the host system, information relating to installation of a network interface operating system; transmit the information to the network interface; and cause the network interface to install the network interface operating system onto the network interface storage resource.

15 Claims, 3 Drawing Sheets

SMART NETWORK INTERFACE CONTROLLER OPERATING SYSTEM DEPLOYMENT

TECHNICAL FIELD

The present disclosure relates in general to information handling systems, and more particularly to methods and systems for deploying an operating system to a smart network interface controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some computing applications, an information handling system may include a hypervisor for hosting one or more virtual resources such as virtual machines (VMs). A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In other applications, an information handling system may be used in a "bare metal" configuration in which only one operating system is installed, and the hypervisor and virtual resources are not needed.

In either scenario, a network interface of the information handling system may comprise a smart network interface card or "SmartNIC" and/or a data processing unit (DPU), which may offer capabilities not found in traditional NICs. For purposes of this disclosure, the terms "SmartNIC" and "DPU" may be used interchangeably.

A SmartNIC may act as a system within a system, including its own Unified Extensible Firmware Interface Basic Input/Output System (UEFI BIOS) and its own operating system (OS) such as ESXio or any other suitable OS. This disclosure describes techniques for deploying a SmartNIC OS to a SmartNIC, and embodiments may be applied both in a manufacturer's factory environment and/or in a customer environment.

SmartNIC OS deployment may need to be done without relying on an external network in some situations. Accordingly, an internal network coupled to a management controller such as a baseboard management controller (BMC) may be leveraged in some embodiments. However, BMC devices often have limited onboard storage and may not be able to store the full OS image for the SmartNIC OS. Accordingly, embodiments of this disclosure may be operable to alleviate such constraints.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with deploying a SmartNIC OS may be reduced or eliminated.

In accordance with embodiments of the present disclosure, an information handling system may include a host system, a management controller configured to provide out-of-band management of the information handling system, and a network interface including a network interface storage resource. The management controller may be configured to: receive, from the host system, information relating to installation of a network interface operating system; transmit the information to the network interface; and cause the network interface to install the network interface operating system onto the network interface storage resource.

In accordance with these and other embodiments of the present disclosure, a method may include, in an information handling system including a host system, a management controller configured to provide out-of-band management of the information handling system, and a network interface that includes a network interface storage resource: the management controller receiving, from the host system, information relating to installation of a network interface operating system; the management controller transmitting the information to the network interface; and the management controller causing the network interface to install the network interface operating system onto the network interface storage resource.

In accordance with these and other embodiments of the present disclosure, an article of manufacture may include a non-transitory, computer-readable medium having instructions thereon that are executable by at least one processor of a management controller of an information handling system for: receiving, from a host system of the information handling system, information relating to installation of a network interface operating system for a network interface of the information handling system; transmitting the information to the network interface; and causing the network interface to install the network interface operating system onto a network interface storage resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
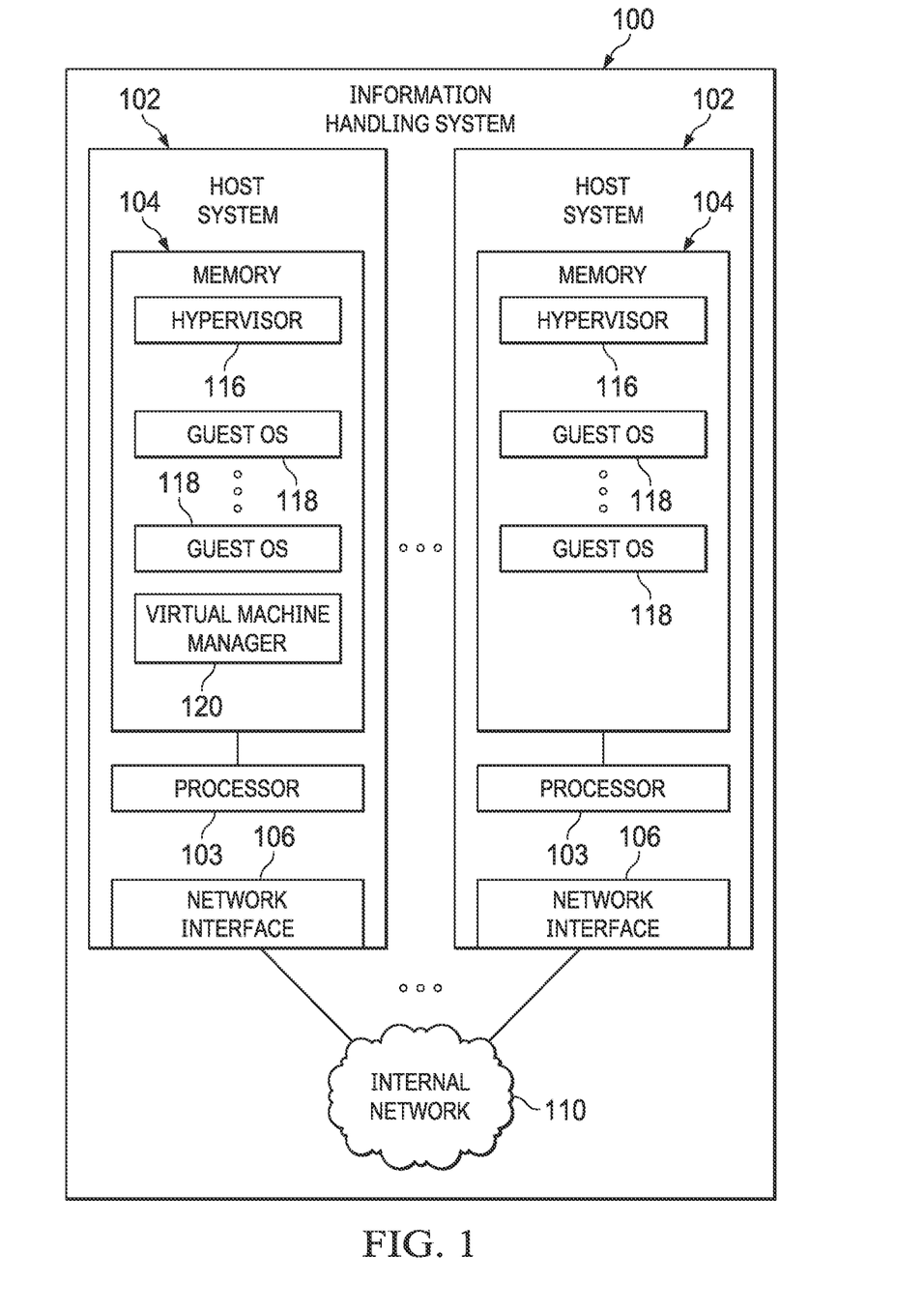
FIG. 1 illustrates a block diagram of selected components of an example information handling system, in accordance with embodiments of the present disclosure.
Figure 2:
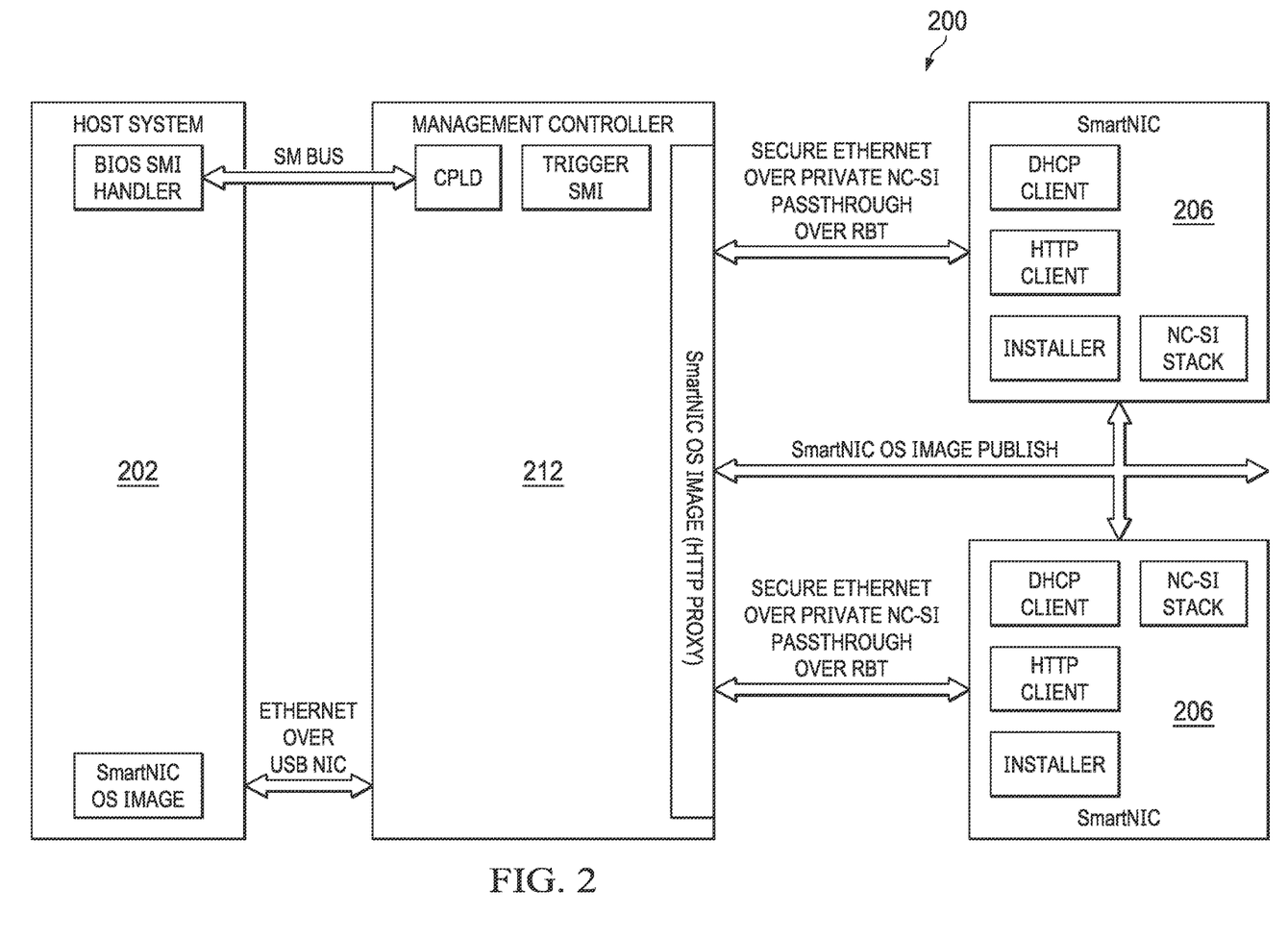
FIG. 2 illustrates a block diagram of selected components of an example information handling system, in accordance with embodiments of the present disclosure.
Figure 3:
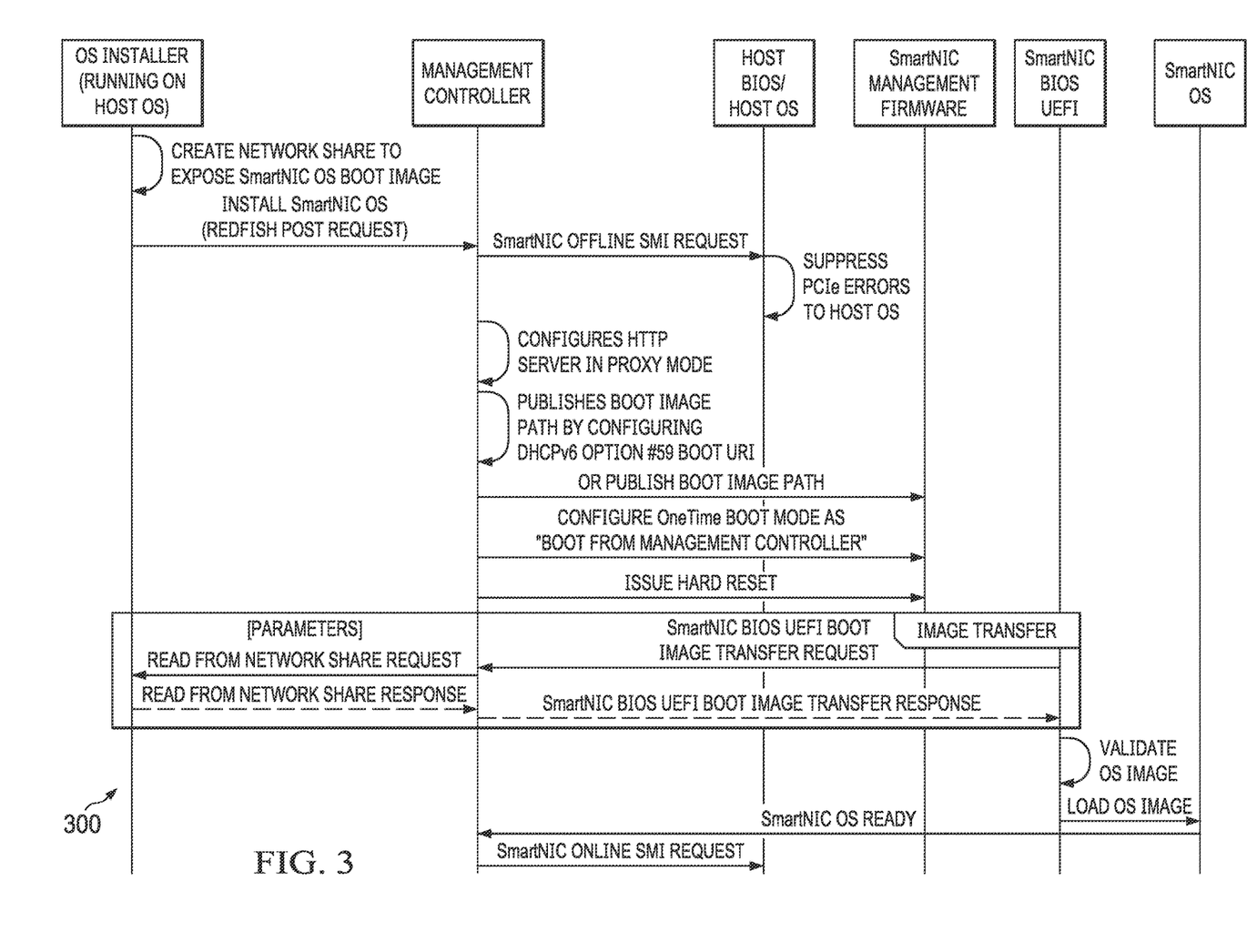
FIG. 3 illustrates an example sequence diagram, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing. Physical computer-readable media such as disk drives, solid-state drives, non-volatile memory, etc. may also be referred to herein as "physical storage resources."

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of selected components of an example information handling system 100 having a plurality of host systems 102, in accordance with embodiments of the present disclosure. As shown in FIG. 1, information handling system 100 may include a plurality of host systems 102 coupled to one another via an internal network 110.

In some embodiments, information handling system 100 may include a single chassis housing a plurality of host systems 102. In other embodiments, information handling system 100 may include a cluster of multiple chassis, each with one or more host systems 102. In yet other embodiments, host systems 102 may be entirely separate information handling systems, and they may be coupled together via an internal network or an external network such as the Internet.

In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, information handling system 100 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 100 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103. Each guest OS 118 may also be referred to as a "virtual machine."

A hypervisor 116 may comprise software and/or firmware generally operable to allow multiple virtual machines and/or operating systems to run on a single computing system (e.g., an information handling system 100) at the same time. This operability is generally allowed via virtualization, a technique for hiding the physical characteristics of computing system resources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, a hypervisor 116 may comprise a specially-designed OS with native virtualization capabilities. In another embodiment, a hypervisor 116 may comprise a standard OS with an incorporated virtualization component for performing virtualization.

In another embodiment, a hypervisor 116 may comprise a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality (e.g., persistent storage).

At least one host system 102 in information handling system 100 may have stored within its memory 104 a virtual machine manager 120. A virtual machine manager 120 may comprise software and/or firmware generally operable to manage individual hypervisors 116 and the guest OSes 118 instantiated on each hypervisor 116, including controlling migration of guest OSes 118 between hypervisors 116. Although FIG. 1 shows virtual machine manager 120 instantiated on a host system 102 on which a hypervisor 116 is also instantiated, in some embodiments virtual machine manager 120 may be instantiated on a dedicated host system 102 within information handling system 100, or a host system 102 of another information handling system 100.

A network interface 106 may include any suitable system, apparatus, or device operable to serve as an interface between an associated information handling system 100 and internal network 110. A network interface 106 may enable its associated information handling system 100 to communicate with internal network 110 using any suitable transmission protocol (e.g., TCP/IP) and/or standard (e.g., IEEE 802.11, Wi-Fi). In certain embodiments, a network interface 106 may include a physical network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable NICs, including without limitation, mezzanine cards, network daughter cards, etc.

In some embodiments, a network interface 106 may comprise a SmartNIC and/or a DPU. In addition to the stateful and custom offloads a SmartNIC or DPU may provide, it may have an independent management domain with a separate operating system, independent credentials, and independent remote access. Accordingly, network interface 106 may include its own specialized processor and memory.

In addition to processor 103, memory 104, and network interface 106, a host system 102 may include one or more other information handling resources.

Internal network 110 may be a network and/or fabric configured to communicatively couple information handling systems to each other. In certain embodiments, internal network 110 may include a communication infrastructure, which provides physical connections, and a management layer, which organizes the physical connections of host systems 102 and other devices coupled to internal network 110. Internal network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Internal network 110 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

As discussed above, embodiments of this disclosure may provide techniques for deploying (installing) an OS to network interfaces 106. Some embodiments may employ Redfish®, which is a communications standard designed to deliver simple and secure management functionality that is supported by many management controllers. Other embodiments may use different communications standards, but the example of Redfish® is discussed in detail herein for the sake of clarity and concreteness.

Further, it should be noted that some embodiments may operate on devices other than SmartNICs. For example, graphics processing units (GPUs), infrastructure processing units (IPUs), and other types of accelerators and smart devices may benefit from the ability to deploy an OS as described herein.

In one embodiment, Redfish® operations may be used to stream data from an installation medium such as a SmartNIC OS image over the network share to a management controller and finally to the SmartNIC device. In the factory installation environment, a host OS installer may host the SmartNIC OS image, which the management controller may connect to by emulating a USB NIC, allowing the SmartNIC OS image to be mounted locally as a virtual storage resource of the management controller (e.g., using DD, ISO, IMG, UEFI, or any other suitable image format).

The management controller may then expose this SmartNIC OS image to the SmartNIC as a network-bootable target image (e.g., using PXE boot or any other suitable network booting technology). In other embodiments (e.g., when an external network is available), the OS deployment image may be exposed via CIFS, NFS, or any other suitable network file sharing technology.

In one embodiment, the management controller may publish a uniform resource identifier (URI) for the bootable SmartNIC OS image via dynamic host configuration protocol. For example, the URI may be published through DHCPv6 option #59 Boot URI. Accordingly, the management controller may act as a proxy and/or a bridge, streaming the data stored in the SmartNIC OS image from the host OS to the SmartNIC to allow the SmartNIC to execute code in the OS image and install the OS.

Further, embodiments of this disclosure may operate in a vendor-independent manner (e.g., providing OS deployment to different types of SmartNICs) without requiring vendor-specific tooling.

Turning now to FIG. 2, a block diagram of selected components of an information handling system 200 is shown, according to some embodiments. Information handling system 200 may include host system 202 and management controller 212. Host system 202 may also include or be communicatively coupled to one or more SmartNICs 206. Host system 202 may be coupled to the hardware of SmartNIC 206 via a communication channel (not shown) such as Peripheral Component Interconnect Express (PCIe) in some embodiments. For the sake of clarity, FIG. 2 illustrates only the communication channel that employs management controller 212, and the PCIe channel is not shown explicitly.

Management controller 212 may be coupled to host system 202 via one or more communication channels, such as Ethernet over USB NIC, a system management bus (SMBus), etc. Management controller 212 may be coupled to SmartNICs 206 via a network controller sideband interface (NC-SI), which may be established over reduced media-independent interface (RMII) based transport (RBT), over PCIe vendor-defined message (VDM), over SMBus, etc.

As discussed in more detail below, management controller 212 may be configured to trigger a system management interrupt (SMI) to cause host system 202 to decouple from SmartNIC 206 while SmartNIC 206 is installing the OS. For example, SmartNIC 206 may need to reboot or may otherwise become non-responsive during the installation process, which could cause host system 202 to crash if it were to happen unexpectedly. By first taking SmartNIC 206 offline from the perspective of host system 206, such a crash may be avoided.

Turning now to FIG. 3, a sequence diagram flow chart is shown of an example method 300 for deploying an OS to a SmartNIC, in accordance with some embodiments.

As shown, the host system may create a network share including a SmartNIC OS boot image, exposing that share to the management controller via its USB NIC. The host system may then transmit a Redfish® command to install the SmartNIC OS. For example, the installer executing on the host OS may invoke a private, in-band SmartNIC OS deployment Redfish® API by providing information such as the SmartNIC fully qualified device descriptor (FQDD), IP address, share name, image name, credentials, timeout, etc.

The management controller may then transmit an SMI request to take the SmartNIC offline, suppressing any PCIe errors from affecting the host. For example, the management controller may locate all OS-capable SmartNIC devices. If one or more of such devices is found, then the management controller may take them all offline during the imaging process to hide any side effects from the host OS and to prevent the host OS from interfering with the SmartNIC while it is being imaged. The management controller may further publish the list of SmartNIC device FQDDs and use a complex programmable logic device (CPLD) to toggle a general purpose input/output (GPIO) pin configured to trigger the SMI request to the host SMI handler.

The host BIOS SMI handler may receive the list of SmartNIC FQDD(s) to take offline, and it may use Downstream Port Containment (DPC) to automatically disable the link below a downstream port following an uncorrectable error. The SmartNIC may then remain effectively invisible and un-enumerated to the host OS until the imaging process is completed.

The management controller may enable a private network channel over NC-SI pass-through over an RBT interface between the SmartNIC and the management controller.

The management controller may then execute an HTTP/HTTPS server in proxy mode to expose the boot image to the SmartNIC. The management controller may publish the boot image path by configuring DHCPv6 option #59 with the filename assigned to the SmartNIC OS image path, or the management controller may send the boot image path over an NC-SI OEM command to the SmartNIC.

The management controller may configure the SmartNIC for booting one time from the management controller's file share. For example, the management controller may transmit UEFI parameters to configure the SmartNIC to boot from the shared image and then cause a reset.

When the SmartNIC reboots, it may then transmit a request to the management controller to retrieve the OS install image. The management controller may act as a proxy/bridge, forwarding the request to the host OS, and then forwarding the OS image data from the host system to the SmartNIC as it is received from the host system.

The SmartNIC may validate the SmartNIC OS image (e.g., by verifying it using a SecureBoot certificate) and then load the image for installation. Once the OS is deployed and the SmartNIC has restarted, it may invoke an internal Redfish® URI to notify the management controller that the OS is installed and ready. The management controller may then bring the SmartNIC back online by triggering another SMI request to the host BIOS.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein (such as the components of FIG. 1 and/or FIG. 2), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a host system;
a management controller configured to provide out-of-band management of the information handling system; and
a network interface including a network interface storage resource;
wherein the management controller is configured to:
receive, from the host system, information relating to installation of a network interface operating system, wherein the received information comprises data from an installation medium, and wherein the management controller is configured to mount the installation medium as a virtual storage resource for remote access by the network interface;
transmit the information to the network interface; and
cause the network interface to install the network interface operating system onto the network interface storage resource.

2. The information handling system of claim 1, wherein the network interface is a SmartNIC.

3. The information handling system of claim 1, wherein the management controller is further configured to trigger a system management interrupt at the host system, the system management interrupt being configured to communicatively decouple the network interface from the host system.

4. The information handling system of claim 1, wherein the network interface is configured to boot from the virtual storage resource.

5. The information handling system of claim 1, wherein the management controller does not comprise a storage resource with sufficient storage space to store the installation medium locally.

6. A method comprising, in an information handling system including a host system, a management controller configured to provide out-of-band management of the information handling system, and a network interface that includes a network interface storage resource:
the management controller receiving, from the host system, information relating to installation of a network interface operating system, wherein the received information comprises data from an installation medium, and wherein the management controller is configured to mount the installation medium as a virtual storage resource for remote access by the network interface;
the management controller transmitting the information to the network interface; and the management controller causing the network interface to install the network interface operating system onto the network interface storage resource.

7. The method of claim 6, wherein the network interface is a SmartNIC.

8. The method of claim 6, wherein the management controller is further configured to trigger a system management interrupt at the host system, the system management interrupt being configured to communicatively decouple the network interface from the host system.

9. The method of claim 6, wherein the network interface is configured to boot from the virtual storage resource.

10. The method of claim 6, wherein the management controller does not comprise a storage resource with sufficient storage space to store the installation medium locally.

11. An article of manufacture comprising a non-transitory, computer-readable medium having instructions thereon that are executable by at least one processor of a management controller of an information handling system for:

receiving, from a host system of the information handling system, information relating to installation of a network interface operating system for a network interface of the information handling system, wherein the received information comprises data from an installation medium, and wherein the management controller is configured to mount the installation medium as a virtual storage resource for remote access by the network interface;

transmitting the information to the network interface; and causing the network interface to install the network interface operating system onto a network interface storage resource.

12. The article of claim 11, wherein the network interface is a SmartNIC.

13. The article of claim 11, wherein the management controller is further configured to trigger a system management interrupt at the host system, the system management interrupt being configured to communicatively decouple the network interface from the host system.

14. The article of claim 11, wherein the network interface is configured to boot from the virtual storage resource.

15. The article of claim 11, wherein the management controller does not comprise a storage resource with sufficient storage space to store the installation medium locally.

* * * * *

UNITED STATES PATENT AND TRADEMARK OFFICE
CERTIFICATE OF CORRECTION

PATENT NO. : 11,977,504 B2
APPLICATION NO. : 17/729217
DATED : May 7, 2024
INVENTOR(S) : Paulraj et al.

Page 1 of 1

It is certified that error appears in the above-identified patent and that said Letters Patent is hereby corrected as shown below:

In the Claims

In Column 11, Line 5, Claim 7, delete "Smart N1C" and insert -- SmartNIC --, therefor.

In Column 12, Line 11, Claim 12, delete "Smart N1C" and insert -- SmartNIC --, therefor.

Signed and Sealed this
Twenty-ninth Day of October, 2024

Katherine Kelly Vidal
*Director of the United States Patent and Trademark Office*